Dec. 18, 1923.
J. M. SIKES ET AL
1,477,916
SUPPLY VALVE FOR FLUSH TANKS
Filed May 24, 1922
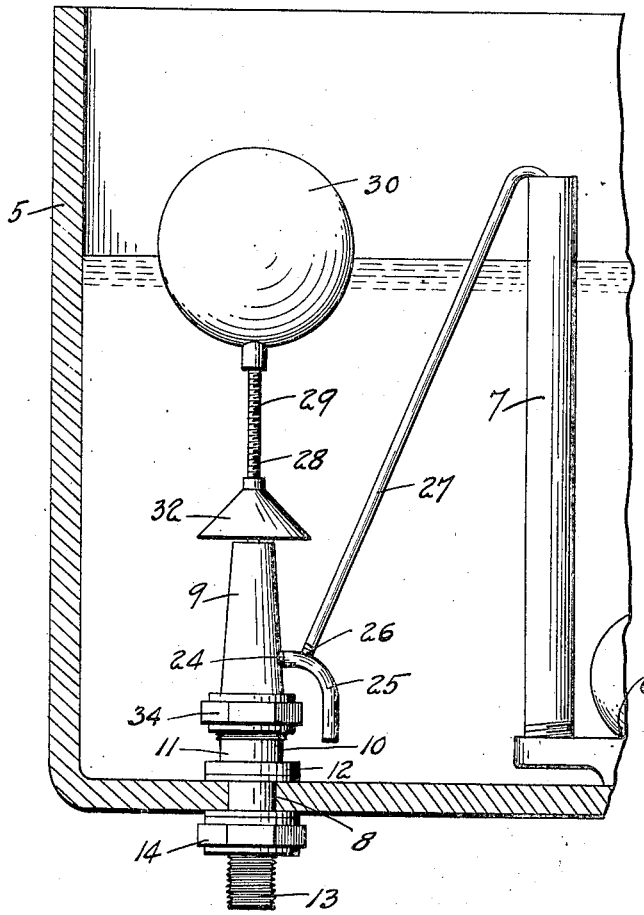
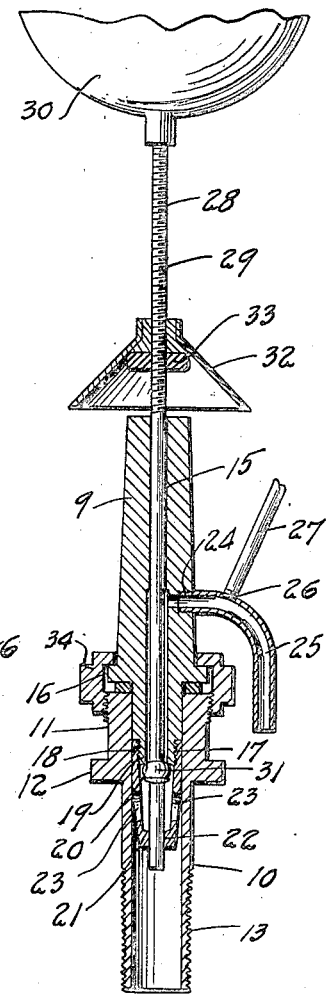
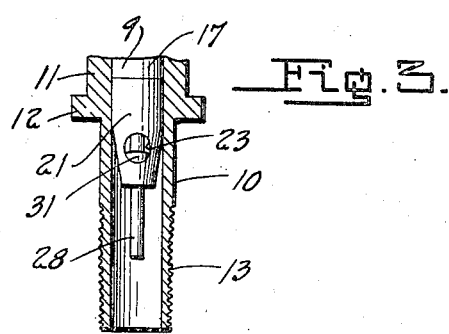
Inventors
James M. Sikes
Clement Elmore
By Watson E. Coleman
Attorney Patented Dec. 18, 1923.

1,477,916

UNITED STATES PATENT OFFICE.

JAMES M. SIKES AND CLEMENT ELMORE, OF DURHAM, NORTH CAROLINA; SAID ELMORE ASSIGNOR TO SAID SIKES.

SUPPLY VALVE FOR FLUSH TANKS.

Application filed May 24, 1922. Serial No. 563,253.

*To all whom it may concern:*

Be it known that we, JAMES M. SIKES and CLEMENT ELMORE, citizens of the United States, residing at Durham, in the county of Durham and State of North Carolina, have invented certain new and useful Improvements in Supply Valves for Flush Tanks, of which the following is a specification, reference being had to the accompanying drawings.

This invention relates to valves, and more particularly to supply valves for flush tanks.

One of the objects of the present invention is to provide a valve of this character which is so constructed that it may be easily inserted in a flush tank, and in which the valve casing is so formed in sections that the sections may be readily separated to permit the repair or replacement of the valve itself.

A further object is to provide a valve of this character which is so constructed that the valve in its closing movement moves with the incoming current of water and not against this water and against its pressure.

With these and other objects in view, the invention consists in the improved construction and arrangement of parts to be hereinafter more particularly described, fully claimed and illustrated in the accompanying drawings, in which:—

Figure 1 is a fragmentary elevation and sectional view of a flush tank, showing the invention applied;

Figure 2 is a longitudinal sectional view of the valve mechanism; and

Figure 3 is a fragmentary sectional view of the valve casing and valve, the valve being shown in its open position.

Referring to the drawings, 5 designates a flush tank of conventional form having the usual water outlet 6, overflow pipe 7, and inlet opening 8. It is of course obvious that this valve may be used with any flush tank, regardless of the position of the inlet and outlet ports.

The valve comprises a sectional casing including an upper section 9 and a lower section 10, said lower section having its upper end 11 enlarged and exteriorly threaded, a flange 12 being provided at the junction of the enlarged portion with the major portion of said section. The lower end portion 13 of the section 10 is adapted to extend through the inlet opening 8 of the tank, while the flange 12 rests upon the bottom of the tank, interiorly thereof, suitable packing and fastening means being used to secure the lower section to the tank, for instance, such as the nut 14 which is positioned exteriorly of the end portion 13 of the section 10.

The upper section 9 of the valve casing is substantially conical and is provided with a longitudinally extending bore 15, said bore being enlarged from the intermediate portion of the section to the base or lower end of the conical section. A flange 16 is provided at the base of the conical section, the purpose of which will be hereinafter described. The lower end portion 17 or base of the conical section, adjacent the flange 16, is reduced to provide a shoulder 18 and a threaded extension 19, the end face of the extension being formed into a valve seat 20.

In connection with the upper section 9 of the casing, a valve cage 21 is used, said cage being also conical, the larger end portion thereof being interiorly threaded for engagement with the threaded extension 19, the lower or apex portion of the cage being reduced and provided with a guide opening 22. The sides of the cage 21 are provided with relatively large inlet ports 23, said ports being arranged to register so as to permit unobstructed flow of water therethrough. The upper conical section 9 of the valve casing is provided with a threaded opening 24, adjacent the central portion of said section, substantially at the junction of the enlarged portion of the bore 15 with the smaller portion thereof. An inlet nozzle 25 is threaded in said opening for the purpose of discharging water into the tank, the inlet nozzle being provided with a threaded opening 26 adapted to receive a refill tube 27, the upper end of said tube extending into the waste pipe 7 by means of which the bowl may be filled with water.

Slidable in the section 9 of the casing is a relatively long valve stem 28, the upper end portion 29 of the stem being threaded, the extremity of the threaded end being arranged to extend into the socket of a conventional form of flush tank float 30.

The lower end portion of the valve stem is provided with a valve 31, said valve being disposed inwardly of the lower end of the valve stem and adapted to engage the valve seat 20 of the section 9. The lower end portion of the valve stem is slidably disposed within the cage 21, and is also slidable through the opening 22 of the cage, so as to properly position the valve with respect to the valve seat 20 and at the same time permit the water to pass through the inlet ports 23.

A conical deflector 32 is provided, said deflector having a threaded opening in its apex portion adapted to receive the upper end portion 29 of the valve stem, said deflector being adjustable on the valve stem and movable therewith and with the movement of the valve 31 within the cage 21.

A bumper 33 in the form of a rubber washer is disposed within the deflector and adapted to engage the upper end of the conical section 9. The purpose of the deflector is to deflect any water that may pass out through the conical section 9 downwardly into the tank, so as to prevent water spouting or splashing to the upper end of the tank. It also serves the purpose of a stop to cooperate with the valve and prevent damage to the valve casing.

In assembling the valve, the valve stem is first inserted in the conical section 9 and the deflector 32 and float 30 applied. The valve cage 21 is threaded on the extension 19 and the lower end portion of the conical section extended into the large portion 11 of the lower section 10. A flange nut 34 is engaged with the exteriorly threaded portion of the end 11 of the section 10, the end 11 engaging the flange 16 of the section 9. By this means both sections are firmly coupled to each other. After the outlet valve has been opened for the flushing operation, the instant the water leaves the predetermined water level of the tank, the float, in view of the absence of water pressure, descends until the valve comes in contact with the lower end of the valve cage. The water then passes through the section 10, through the valve cage and conical section 9 and out of the nozzle 25 into the tank, a portion of the water passing through the refill tube and the waste pipe into the water closet bowl. When the water of the tank rises to a sufficient height to act on the float 30, the pressure of the water will raise the float thereby urging the valve 31 into engagement with the valve seat 20 and shutting off the supply of water.

From the foregoing it will be readily seen that this invention provides a novel form of flush tank valve so arranged that the valve in closing does not operate against the pressure of the water, but with the pressure and wherein the float is supported at a distance from the side walls of the tank so that there is no danger of the movement of the float being frictionally resisted by the side walls of the tank, nor inasmuch as levers are eliminated will there be such frictional resistance to the movement of the float. One of the principal advantages possessed by our construction is that it is capable of easy engagement with the tank or easy disengagement therefrom. It is easily installed and easily removed for repairs. It is not necessary in order to remove the valve 31 for repairs that the member 10 be removed, but merely that the coupling 34 be unscrewed and then the section 9 be lifted out with the valve. After this the cage 21 may be removed and access readily had to the valve. The cage 21 acts to center the valve stem and the valve upon its seat, and furthermore protects the valve from injury. All of these features are possessed by a device that is composed of a small number of simple parts.

What is claimed is:—

1. A flush tank valve comprising a sectional valve casing, one section of said casing having its lower end reduced and provided with a valve seat on the reduced end, a valve cage carried by said reduced end, a valve stem slidable in said section and the cage, a valve carried by the valve stem within the cage and adapted to engage the valve seat, a float carried by the opposite end of the stem, the remaining section of said casing being engaged with the reduced end of the first mentioned section, and means for coupling said sections to each other and the last mentioned section to a flush tank.

2. A flush tank valve comprising a valve casing formed in sections, one section being adapted to pass through the bottom of the flush tank and being provided with a shoulder adapted to confront the bottom, the lower end of this section being externally screw-threaded and the upper end of the section being externally screw-threaded, a second section having a reduced portion formed to slidingly fit the interior of the upper end of the first section and being formed with an annular shoulder to confront said first section, the lower end of this second section being exteriorly reduced and formed with a valve seat, the reduced portion being exteriorly screw-threaded, the second section being formed with a bore extending longitudinally through the second section, a valve cage engaging the screw-threaded end of the second section and having inlet openings and a central guide opening, a coupling adapted to engage the screwthreads at the upper end of the first section and engage the shoulder on the second named section, and a valve stem passing through the second named section and carrying a valve at its lower end and a float at its upper end, the lower end of the valve stem extending through said guide opening in the cage, the second named section being formed with an outlet aperture connecting the said bore.

In testimony whereof we hereunto affix our signatures.

JAMES M. SIKES.
CLEMENT ELMORE.